(12) United States Patent
Pohlan

(10) Patent No.: US 8,181,172 B2
(45) Date of Patent: May 15, 2012

(54) METHOD FOR OPERATION OF AN AUTOMATION SYSTEM

(75) Inventor: Rudolf Pohlan, Waldbronn (DE)

(73) Assignee: Siemens Aktiengesellschaft, München (DE)

( * ) Notice: Subject to any disclaimer, the term of this patent is extended or adjusted under 35 U.S.C. 154(b) by 1155 days.

(21) Appl. No.: 12/009,302

(22) Filed: Jan. 17, 2008

(65) Prior Publication Data

US 2008/0177401 A1    Jul. 24, 2008

(30) Foreign Application Priority Data

Jan. 18, 2007    (EP) .................................... 07001083

(51) Int. Cl.
*G06F 9/44* (2006.01)
(52) U.S. Cl. ...................................................... 717/168
(58) Field of Classification Search ................... 717/168
See application file for complete search history.

(56) References Cited

U.S. PATENT DOCUMENTS

| 5,497,315 | A | | 3/1996 | Sugiura et al. | |
|---|---|---|---|---|---|
| 5,818,711 | A | | 10/1998 | Schwabe et al. | |
| 5,862,052 | A | * | 1/1999 | Nixon et al. | 713/1 |
| 6,662,312 | B1 | * | 12/2003 | Keller et al. | 717/124 |
| 7,286,953 | B1 | * | 10/2007 | Li et al. | 717/100 |
| 7,581,212 | B2 | * | 8/2009 | West et al. | 717/136 |
| 2004/0073320 | A1 | * | 4/2004 | Windl | 700/18 |
| 2005/0149905 | A1 | * | 7/2005 | Brink | 717/100 |
| 2007/0067767 | A1 | * | 3/2007 | Da Silva Neto | 717/174 |
| 2007/0240127 | A1 | * | 10/2007 | Roques et al. | 717/136 |

FOREIGN PATENT DOCUMENTS

| DE | 10236801 A1 | 3/2004 |
|---|---|---|
| EP | 1379942 B1 | 7/2006 |
| WO | WO 02073326 A2 | 9/2002 |

OTHER PUBLICATIONS

Generating Test Cases for Web Services Using Extended Finite State Machine; Keum et al; 2006; IFIP.*
"State-Based Testing of Integration Aspects"; Xu et al; 2006; ACM.*

* cited by examiner

*Primary Examiner* — Wei Zhen
*Assistant Examiner* — Junchun Wu

(57) ABSTRACT

A method for operation of an automation system is specified, with programming elements for integration into a control program provided for the control and/or monitoring of a technical process being transferred or being able to be transferred from a programming device included at least part of the time in the automation system to at least one automation device included in the automation system, with a program element being assigned a first state which identifies this element as available for the control program or a second state which identifies the program element as integrated into the control program, in which there is provision for each program element to be assigned or be able to be assigned at least one further state, so that this state, especially for program modifications, when program elements have been deleted for example, enables the option of testing (debugging) the control program at any time to be maintained.

16 Claims, 5 Drawing Sheets

METHOD FOR OPERATION OF AN AUTOMATION SYSTEM

CROSS REFERENCE TO RELATED APPLICATIONS

This application claims priority of European Patent Office application No. 07001083.0 EP filed Jan. 18, 2007, which is incorporated by reference herein in its entirety.

FIELD OF INVENTION

The invention relates to a method for operation of an automation system, with load objects, such as program elements and such like for example, being transferred or able to be transferred from a programming device included for at least part of the time in the automation system to an automation device included in the automation system, with a transferred load object being assigned either a first or a second state, with the first state identifying the load object as available in the automation system and the second state identifying the load object as integrated into a control program able to be executed by the automation system.

BACKGROUND OF INVENTION

These types of method are known and are implemented for example in the automation systems such as those offered by the applicant under the brand name "SIMATIC". In such methods the two states mentioned above are identified as the "offline programming state" or the "online programming state".

As a result of such a functionality during the commissioning of industrial systems the respective control programs are loaded for the automation of a plant (automation solution) into automation devices, such as programmable logic controllers (PLC) for example, process computers or such like and executed. The automation system is created in such cases with the aid of so-called engineering systems. For this purpose an engineering system usually provides one or more programming tools for respective programming methods or programming languages supported—such as statement lists, ladder logic, function block diagrams, structured text (ST), continuous function charts (CFC), sequential function charts (SFC), etc. With continuous industrial or power engineering processes in particular a precise control of the loaded control programs (online program state) and of the modified, not yet (completely) loaded program (offline program state) by the commissioning engineer is needed, since for these applications especially only modified load objects are selectively reloaded and not the entire control program.

One problem, used as its starting point by the present invention, now consists of offering such programming tools for such automation systems, i.e. offering methods for its operation which provide the best possible support for the commissioning engineer during testing and loading modifications of the control program, especially for a plant which is in operation. The particular requirement lies here in the administration of modifications of the control program, so that load states of individual load objects are rendered transparent to the commissioning engineer in the sense of an illustration, especially a visual illustration, and program modifications can be reloaded in a controlled manner into the automation device, i.e. the programmable logic controller or the process computer for example, and tested.

Also known in the area of automation technology are programming tools which include functionality that makes it possible to modify and subsequently load the offline control program and as well as to test the online control program. Often symbolic or graphical reverse translation information is not available or is no longer (completely) available for online testing, in order to represent the control program in accordance with the original input of the user. A number of programming tools therefore allow a test (debugging) of a control program only if offline and online program state match, i.e. the modifications have already been loaded, i.e. are integrated into the control program. The lack of an overview of the differences between online and offline program state is accordingly felt to be not yet entirely satisfactory in the known implementation. Online and offline program state are synchronously reconciled there and must be put into an identical state by reloading the changes before a test is sensibly possible. Load states relating to individual load objects, i.e. especially programming elements, are not available to the user.

In the case of automation processes in the field of power stations in particular an engineering system offered by the applicant for programming with a Continuous Function Chart (CFC) already provides for administration of load states for the so-called modules used there (an example for load objects). The load states, i.e., whether a module has already been loaded into the CFC plan or not, are visualized to the user by a corresponding color coding. However such visualization is restricted for deleted modules and deleted interconnections, i.e. signal connections. Deleted modules are still indicated inadequately graphically, in which case the option of debugging is also lost. To this extent even this solution known in the prior art is felt to be capable of improvement and worthy of improvement.

For the further prior art the reader is also referred in this context to EP 1 379 942 also attributable to the applicant, in which a programming device with a software tool is described which comprises means for detecting software modules in the programming device, means for detecting software modules in an automation device connected to communicate with it and means for comparing the modules in the programming and automation device. The results of the comparison are displayed with the software tool proposed there.

SUMMARY OF INVENTION

Using the described prior art as its starting point, the underlying object of the invention is to create a method for operation of an automation system that gives a user even better support in the creation, commissioning and maintenance of automation solutions and in doing so especially gives them the option of debugging completely or at least to a major extent.

In accordance with the invention this object is achieved with the features of an independent claim. To this end, with a method of the type mentioned above, there is provision for each load object to be assigned or be able to be assigned at least one further state. By the provision of at least of one further state beyond the known first and second state it is possible to administer the individual load objects with an improved accuracy. The first state thus identifies an object as newly created but still not yet belonging to the online program. The second state identifies a load object as loaded and integrated into the control program, i.e. as belonging to the online program. The third state, inserted in accordance with the approach of the invention, identifies a load object as deleted, but still belonging to the online program.

The invention has the advantage that the option of testing the control program is retained at any point in time. A control program can therefore be tested at any point in time on the basis of the current source, since in the test mode only variables and instructions already loaded are considered. Load objects identified for deletion, which are however still by definition contained in the online program, thus remain included in the consideration. New variables and instructions not yet loaded, i.e. load objects covered by program modifications, are graphically represented but are ignored in a program test. This thus enables the control program to be completely tested at any point in time.

Further advantages and details emerge with reference to the subclaims. References back used in such cases refer to the further embodiment of the subject matter of the main claim through the features of the respective subclaim; they are not to be understood as dispensing with the objective of an autonomous protection of the subject matter for the feature combinations of the referenced subclaims. Furthermore in respect of an arrangement of the claims for a more detailed specification of a feature in a subordinate claim, it is to be assumed that this type of restriction is not present in the preceding claims in each case.

Preferably there is provision for load objects to be transferred from the programming device to the automation device or to each automation device automatically depending on the respective state. To this end a source program underlying the control program indicates at any point in time which load objects are still to be reloaded, because these are marked in accordance with the first state (load state: "Created"). Load objects identified as to be deleted are identified in accordance with the third state (load state: "Deleted") and are likewise still to be reloaded. The load process in this case looks after a deletion of the load objects in the memory of the respective automation device. It should be mentioned once again that load objects to be reloaded, i.e. results of underlying changes of the source program, do not prevent testing of the control program. Load objects can also have the state "Initialized/Changed" if they are still to be reloaded. Such states are assigned to the individual load objects in the form of attributes which can assume already specified identifications such as "Created", "Deleted", "Initialized/Changed", etc., are values which can assume such attributes. Accordingly load objects or the attributes assigned to these objects can also have the state "Loaded" if they are already loaded and belong to the online program. Load objects with the state "Loaded", i.e. load objects with the second state, do not by definition take part in a so called difference load process.

There is also preferably provision in the operating process for a logging of the respective states assignable to a load object as well as a transition between a respective initial state and a target state to be undertaken as a kind of state automaton This aspect of the invention thus deals with the fact that each load object and its graphic representation is fully administered in accordance with a defined load state automaton. The graphical representation of a load object in this case is marked depending on the current load state, such that the user can directly see its state for each load object.

BRIEF DESCRIPTION OF THE DRAWINGS

An exemplary embodiment of the invention is explained in more detail below based on the drawing, which is not to be understood as restricting the invention. Instead numerous alterations or modifications are possible within the framework of the current disclosure, especially such variants as are described for example through combination or variation of individual features or elements or method steps described in connection with the general or specific part of the description, as well as features contained in the claims and/or the drawing able to be derived by the person skilled in the art in respect of the solution of the task and which lead by combinable features to a new subject matter or to new method steps or sequences of method steps. Objects or elements which correspond are provided with the same reference symbols in all figures.

The figures show

DETAILED DESCRIPTION OF INVENTION

Figure 1:
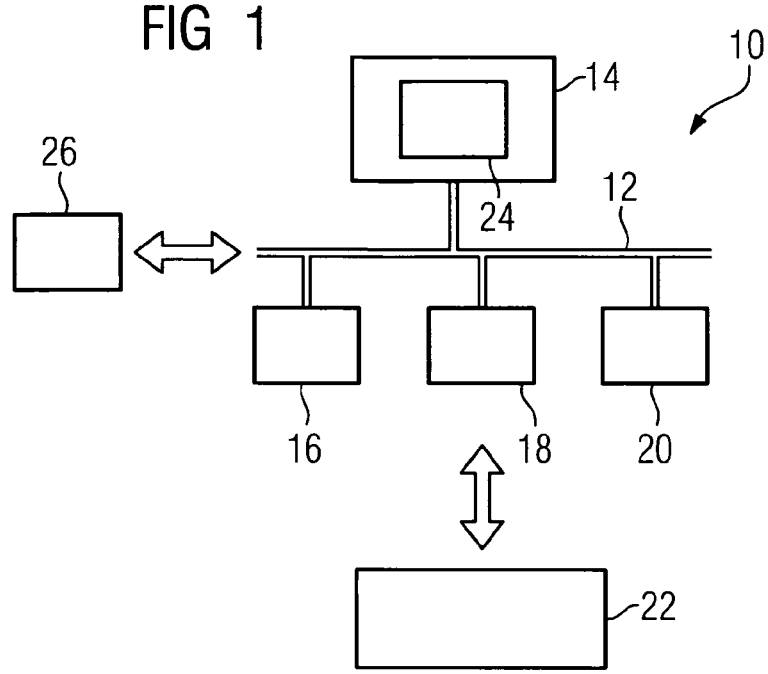
FIG. 1 an automation system with a number of automation devices included in it and a programming device included in the system for at least part of the time, FIG. 2 through FIG. 6 different representations of a load state automaton preferably used in the implementation of the inventive approach as well as FIG. 7 and FIG. 8 graphical representations of results obtainable in the application of the inventive method for improved ability to distinguish load objects.

FIG. 1 shows in s simplified schematic diagram an overall automation system identified by the number 10, which is formed by a number of automation devices 14, 16, 18, 20 connected for communication purposes via a bus 12 or suchlike and which is provided in its entirety for control and/or monitoring of technical process 22 not shown in any greater detail and for this purpose processes an automation solution implemented in software, i.e. a control program 24 or such like.

By means of a programming device 26 included in the automation system 10 load objects, especially program elements, such as function modules and such like for example, for integration into a control program 24 provided for control and/or monitoring of the technical process are transferred to at least one automation device 14 to 20.

In such cases a load object can, in a manner known per se, be assigned a first state, which identifies the load object as available for the control program 24, or a second state, which identifies the load object as integrated into a control program 24 executable by the automation system 10 or by one or more automation devices 14, 16, 18, 20 included in it. In addition each load object can be assigned at least one further state as illustrated below with reference to the further figures, with the method described at the start or subsequently being applicable for all programming languages in automation technology.

Figure 2:
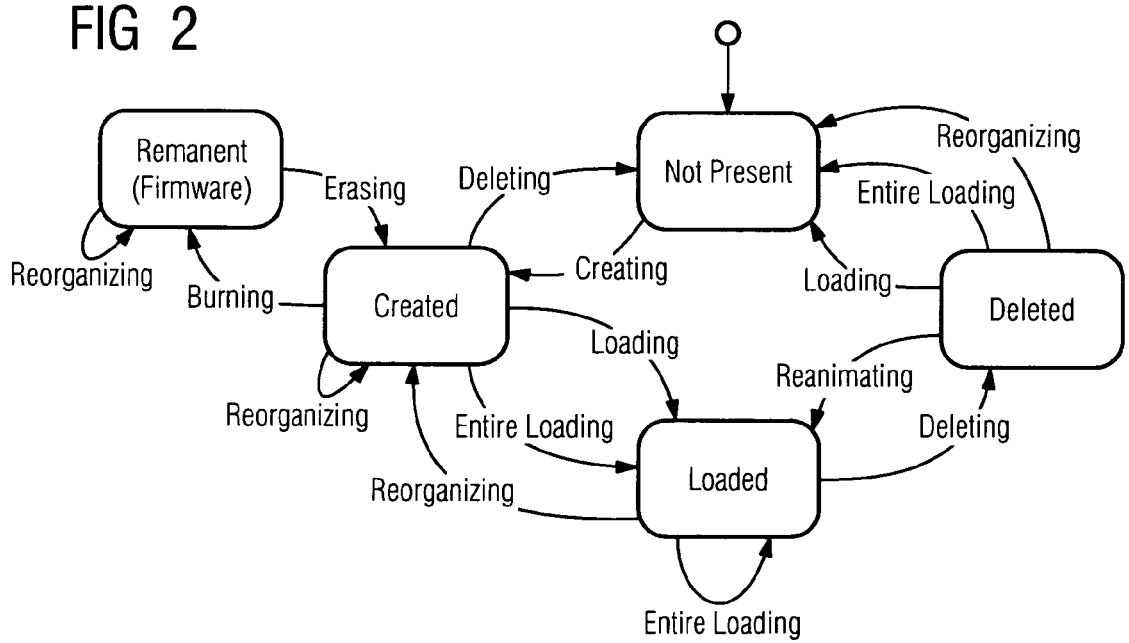

A logging of the respective states assignable to a load object as well as a transition between a respective initial state and a target state is recorded in a preferred embodiment of the invention as a kind of state automaton. In addition the load state automaton also defines the possible load states and state transitions provided between them. Load states or transitions other than those defined by the load state automata cannot occur. To this end the inventively provided states are shown in FIG. 2 as "Not Present", "Deleted", "Loaded", "Created" as well as optionally "Remanent" and the permitted intermediate transitions between them.

In these cases the load state automaton distinguishes between the following load states for program elements:

Not Present (original state)
    A program element is transferred into this state within the framework of the loading process. The program element thus no longer exists. A new program element is also created from this origin state.

Created
    This state indicates that the program element is new and still has to be loaded, meaning that it does not belong to the online program.

Loaded
: This state shows that the program element has already been loaded and thus belongs to the online program.

Deleted
: This state shows that the program element has already been loaded once and thus belongs to the online program. However this program element has been deleted in the source program in the meantime. The program element is still "alive" but is identified as to be deleted.

A state transition can be brought about by the following events:

Creating
: This event sets up a new program element. The program element however does not yet belong to the online program.

Loading
: This event loads a program element within the framework of a selective loading process or within the framework of a so-called difference loading into the memory of the controller.

Entire Loading
: This event loads all program elements into the memory of the controller and deletes the program elements identified as to be deleted.

Deleting
: This event deletes a program element by actually destroying it or by identifying it as to be deleted.

Reanimating
: This event cancels the delete code of a program element again. The program element identified as to be deleted subsequently has the state which it had had before the delete event (Deleting).

Reorganizing
: This event returns all program elements to the original state after creation. Program elements identified as to be deleted are finally destroyed.

Figure 3:
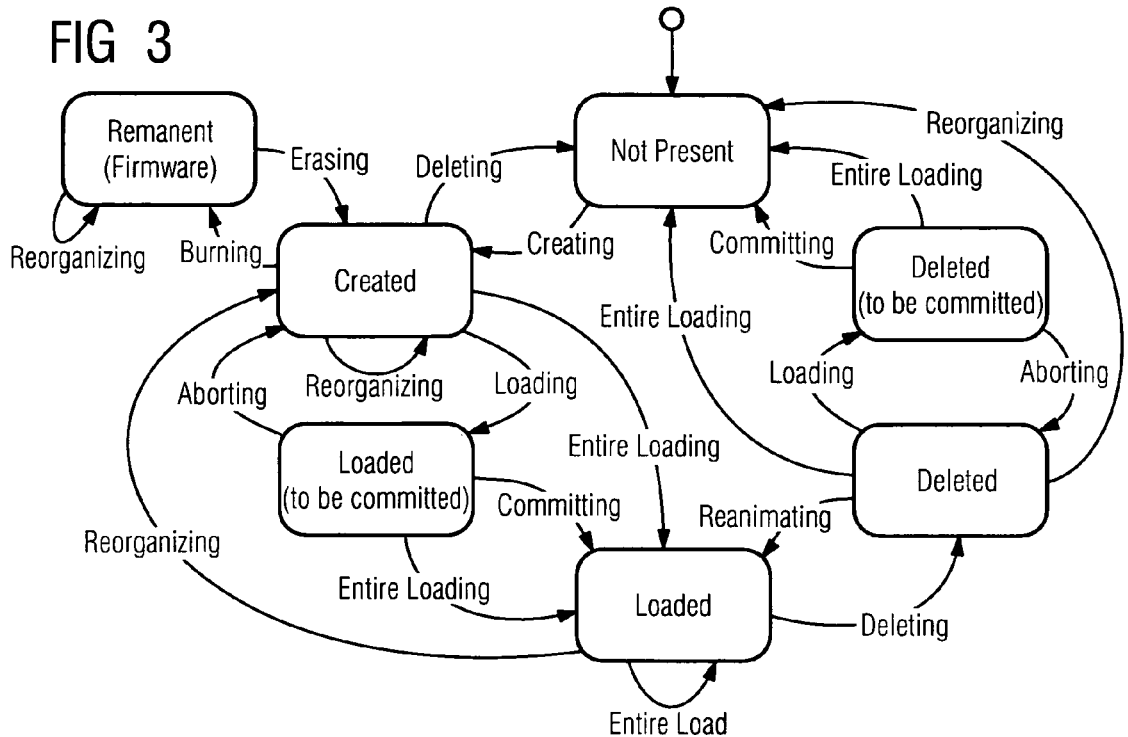

Two additional transition states are introduced into the load state automaton in the diagram shown in FIG. 3 compared to those shown in the diagram in FIG. 2:

Loaded (to be committed)
: This state indicates that the program element has just been loaded. In order to finally accept the state "Loaded" this must however still be confirmed with the event "Committing".

Deleted (to be committed)
: This state indicates that the program element has just been removed from processing in the controller. In order to be finally deleted in the memory of the control this must still however be confirmed with the event "Committing".

These transitional states provide a simple method of canceling a loading process (Aborting). This is especially sensible if the loaded program modifications require further correction and the program is to be reset to its old state. A prerequisite for the introduction of these transitional states is however appropriate support of the runtime system on the controller.

Figure 4:
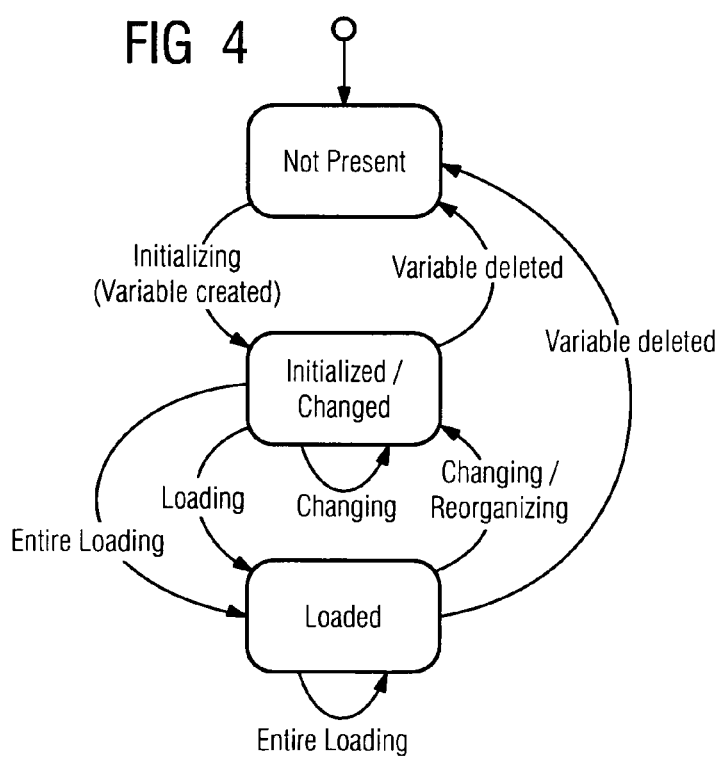

FIG. 4 shows that a specific restricted load state automaton can be used for process values of variables and other attributes of variables. This administers the modification of attribute values.

Figure 5:
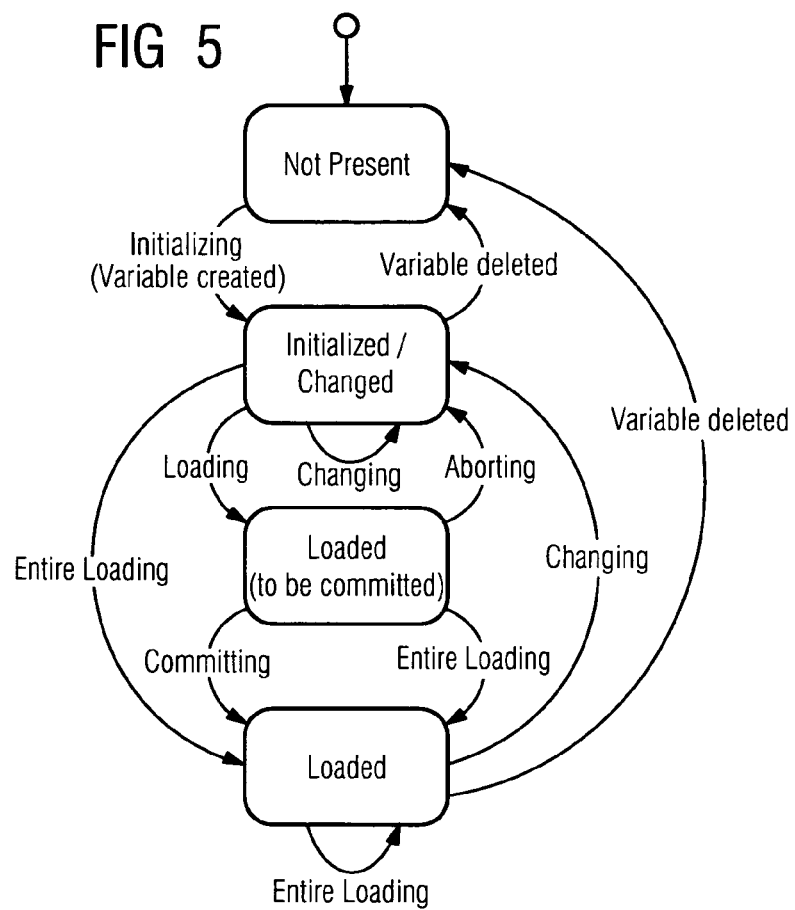

The transitional state "Loaded" (to be committed) also makes sense for the reloading of attribute values, in order in cases of doubt, to be able to cancel the load process, i.e. the modification of the attribute values of the variables again, as is shown in FIG. 5.

Figure 6:
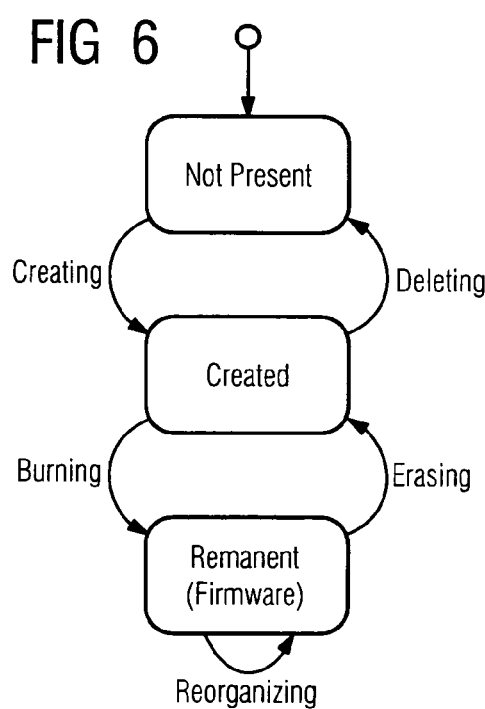

The section of the state automaton shown in simplified form in FIG. 6 describes an option for special handling for program elements which are an element of the runtime system of the control (firmware) and therefore do not need to be loaded. Program elements which are a component of the runtime system of the controller will typically be created immediately in the initialization phase of the program and transferred to the state "Remanent". Examples of this type of program elements are field devices in automation technology which already supply a set of functions which can only still be parametrized or connected.

Remarks: The setting up of so-called remanent program elements occurs in two stages using the events "Creating" and "Burning". The reasons for this are exclusively to do with programming, because this enables program elements to be created in a uniform manner using create methods. It would also be conceivable for remanent program elements to be transferred directly to the "Remanent" state on creation.

Overall this has the advantage for the inventive approach that the current load state is able to be read off for the user for each program element; the user is given complete information about whether a program element is loaded, newly created, modified or deleted.

An important feature of this method is that deleted load objects (program elements) are also completely administered and thereby an unrestricted testing capability of these load objects (program elements) to be deleted in the online program remains guaranteed until the load objects to be deleted are actually deleted after a corresponding load process in the memory of the controller. The decisive advantage of this method is thus the complete testability of the control program at any given point in time, regardless of whether changes have already been made to the program or not. Because of the graphical marking of the load objects it is easily possible for the user to differentiate the load objects precisely according to which program elements belong to the loaded online program and which program elements belong to the current offline program. The testing of the loaded controller program on the basis of the current source program which might be modified remains possible, without prior reloading of the changes. Before the user (commissioning engineer) reloads the changes, he can test the online program state once again in the context of the modified source program.

This method is applicable for any programming language in automation technology. Only then does an overall advantage emerge for the user of how control of the program state is provided independent of the programming language across all modified program sections.

The integrated administration of remanent program elements (system functions) represents a further advantage.

The completely joint administration of the online and offline program states also represents the basis for the generation of a list of changes. Since all states incl. the old states are administered before the modification of the program, an "online-offline comparison" can be undertaken in a simple manner. The user is thus given an overview of the program modifications since the last loading process. As a side effect, this represents an important feature of this method.

Figure 7:
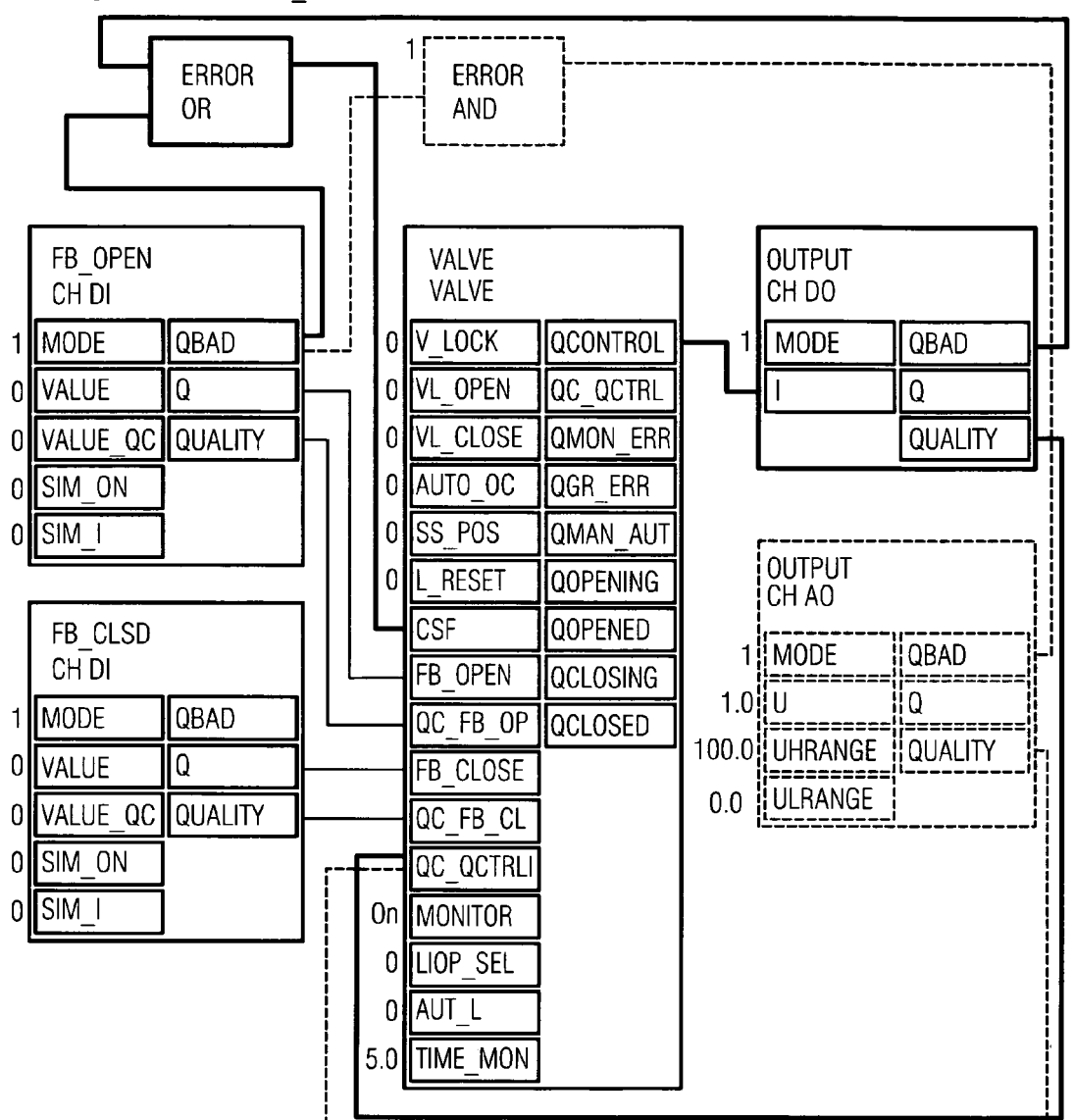

Finally FIG. 7 illustrates, with reference to a Continuous Function Chart (CFC) an example of how the load states of individual load objects could be graphically visualized to the applicant in the form of program elements. The diagram illustrates once again the special features of the inventive method, by which program elements identified by the load state "Deleted" as to be deleted also continue to appear completely in the source program. Each program element is marked in accordance with its load state, with simple lines indicating a loaded program element (state "Loaded"), bold lines a new program element (state "Created") and dashed lines a deleted program element (state "Deleted").

Figure 8:
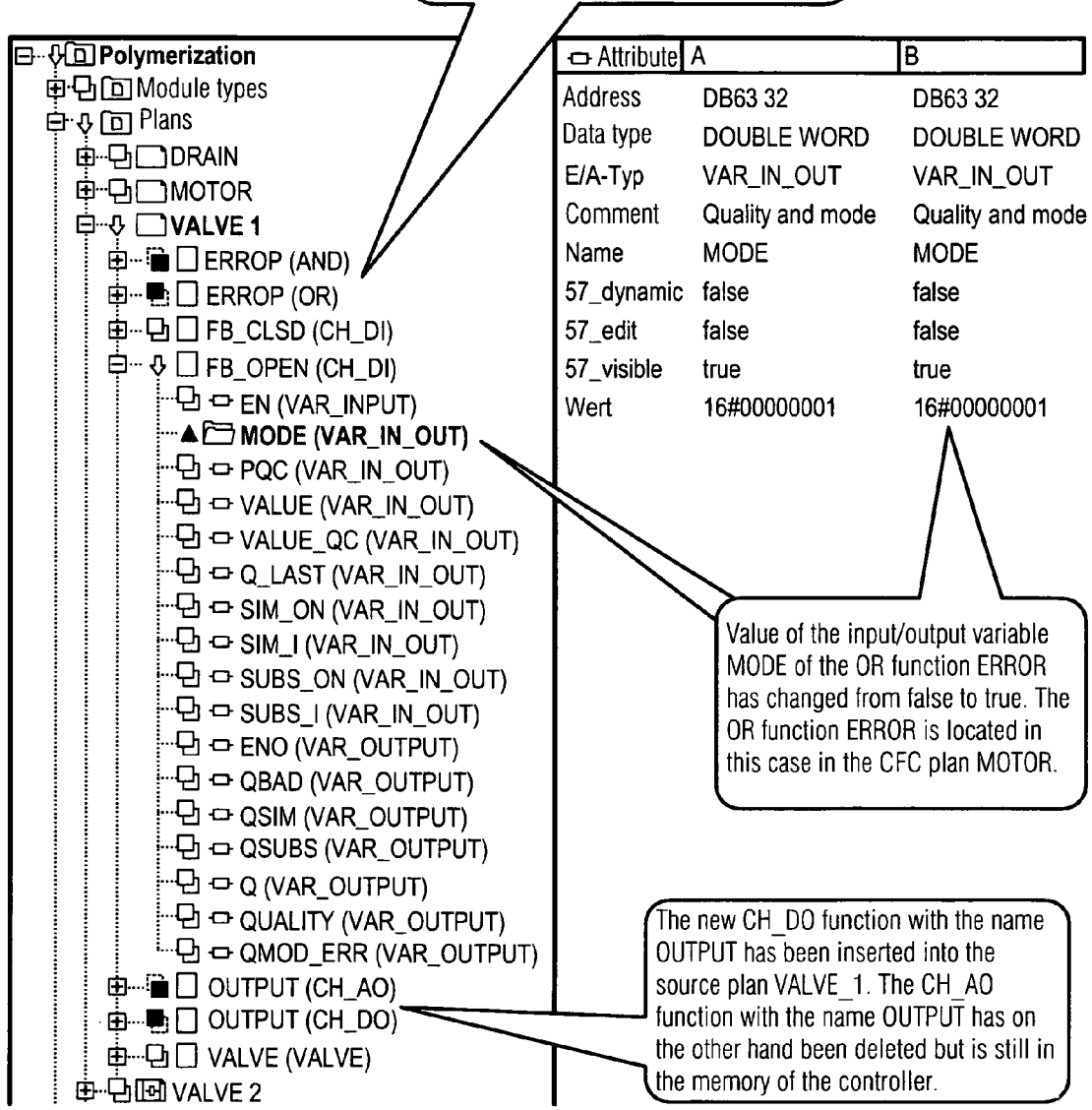

In a similar way a representation derived from the respective load state of load objects can be adapted in other forms of presentation, as is shown for example in FIG. 8.

Thus the invention can be briefly presented as follows:

A method for operation of an automation system 10 is specified, whereby load objects, especially program elements for integration into a control program 24 provided for control and/or monitoring of a technical process 22 are transferred or able to be transferred from a programming device 26 included at least part of the time in the automation system 10 to at least one automation device 14, 16, 18, 20 included in the automation system 10, with a program element being assigned a first state which identifies said element as available for the control program 24, or a second state which identifies the program element as being integrated into the control program 24, in which there is provision for each program element to be assigned or able to be assigned at least one further state, so that, especially if program changes are made, if program elements are deleted for example, the option of testing (debugging), the control program 24 is always retained.

The invention claimed is:

1. A method for operation of an automation system, comprising:
    providing a load object for integration into a control program for a technical process, wherein the load object is transferable from a source program of a programming device to at least one automation device; and
    assigning a state to the load object, wherein
        a first state assigned to the load object identifies the load object as being available for the control program,
        a second state identifies the load object as being integrated into the control program and able to be executed by the automation system, and
        at least a further state is assigned to the load object identifying the load object as deleted for load objects that are loaded into the control program but have since been deleted in the source program, wherein each load object identified as deleted still remains available for testing in the control program until it is actually deleted after a corresponding load process.

2. The method of operation as claimed in claim 1, further comprising two additional load states comprising transition states that provide for aborting the process identified by the transition states.

3. The method of operation as claimed in claim 1, further comprising providing a visualization of the control program that comprises a representation of the state assigned to each load object wherein each load object identified by the further state as deleted still continues to appear in the visualization until it is removed from a memory to which the automation system has access.

4. The method of operation as claimed in claim 1, wherein load objects are transferred from the programming device to the automation device automatically based upon the respective state.

5. The method of operation as claimed in claim 2, wherein load objects are transferred from the programming device to the automation device automatically based upon the respective state.

6. The method of operation as claimed in claim 3, wherein load objects are transferred from the programming device to the automation device automatically based upon the respective state.

7. The method of operation as claimed in claim 1, wherein the respective states assigned to a load object as well as a transition between a respective initial state and a target state are logged.

8. The method of operation as claimed in claim 7, wherein the logging is based on a type of state automaton.

9. The method of operation as claimed in claim 2, wherein the respective states assigned to a load object as well as a transition between a respective initial state and a target state are logged.

10. The method of operation as claimed in claim 3, wherein the respective states assigned to a load object as well as a transition between a respective initial state and a target state are logged.

11. A non-transitory computer readable medium encoded with software for a method for operation of an automation system, comprising:
    providing a load object for integration into a control program for a technical process, wherein the load object is transferable from a programming device to at least one automation device; and
    assigning a state to the load object, wherein
        a first state assigned to the load object identifies the load object as being available for the control program,
        a second state identifies the load object as being integrated into the control program able to be executed by the automation system, and
        at least a further state is assigned identifying the load object as deleted for load objects that are loaded into the control program but have since been deleted in the source pmram, wherein each load object identified as deleted still remains available for testing in the control program until it is actually deleted after a corresponding load process.

12. The non-transitory computer readable medium of claim 11, further comprising two additional load states comprising transition states that provide for aborting the process identified by the transition states.

13. The non-transitory computer readable medium of claim 11, further comprising providing a visualization of the control program that comprises a representation of the state assigned to each load object wherein each load object identified as deleted still continues to appear in the visualization until it is removed from a memory to which the automation system has access.

14. A method for operation and testing of an automation system, comprising:
    receiving load objects from a source program of a programming device representing an offline program state by a control program of an automation device representing an online program state;
    assigning a load state to each load object, wherein the load state comprises one of
        a first state that identifies the load object as being created, indicating the load object is available at the source program but not yet loaded into the control program,
        a second state that identifies the load object as being loaded, indicating the load object is integrated into the control program and able to be executed by the automation system, and
        a third state that identifies the load object as being deleted, indicating that the load object has been previously loaded into the control program but has since been deleted in the source program;
    testing the automation system wherein each load object identified as deleted still remains available for testing in the control program until it is actually deleted after a corresponding load process, thereby allowing debugging of the control program even when the offline program state is not synchronized with the online program state.

15. The method of claim 14, further comprising
assigning two additional load states comprising transition states that provide for aborting the respective processes of loading and deleting identified by the transition states.

16. The method of claim 14, further comprising
providing a visualization of the control program that comprises a representation of the state assigned to each load object wherein each load object identified as deleted still continues to appear in the visualization until it is it is actually deleted after a corresponding load process.

* * * * *